(12) United States Patent
Su et al.

(10) Patent No.: US 12,254,426 B2
(45) Date of Patent: Mar. 18, 2025

(54) PRODUCTION LINE OPERATION FORECAST METHOD AND PRODUCTION LINE OPERATION FORECAST SYSTEM

(71) Applicant: Industrial Technology Research Institute, Hsinchu (TW)

(72) Inventors: Tsan-Cheng Su, Tainan (TW); Hao-Jhe Huang, New Taipei (TW); Chung-Wei Lin, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 357 days.

(21) Appl. No.: 17/874,302

(22) Filed: Jul. 27, 2022

(65) Prior Publication Data

US 2023/0342675 A1    Oct. 26, 2023

(51) Int. Cl.
*G06Q 10/04* (2023.01)
*G06Q 10/06* (2023.01)
(Continued)

(52) U.S. Cl.
CPC ....... *G06Q 10/04* (2013.01); *G06Q 10/06393* (2013.01); *G06Q 10/067* (2013.01); *G06Q 50/04* (2013.01)

(58) Field of Classification Search
CPC .............. G06Q 10/04; G06Q 10/06393; G06Q 10/067; G06Q 50/04; G06Q 10/06312
See application file for complete search history.

(56) References Cited

U.S. PATENT DOCUMENTS

| | | | |
|---|---|---|---|
| 5,369,570 | A | 11/1994 | Parad |
| 7,302,304 | B2 | 11/2007 | Chen et al. |

(Continued)

FOREIGN PATENT DOCUMENTS

| | | |
|---|---|---|
| CN | 111108454 | 5/2020 |
| CN | 112907150 | 6/2021 |

(Continued)

OTHER PUBLICATIONS

Bao Huy Huynh et al., "Discrete Event Simulation for Manufacturing Performance Management and Optimization: A Case Study for Model Factory", 2020 9th International Conference on Industrial Technology and Management, Feb. 2020, pp. 16-20.

(Continued)

*Primary Examiner* — Charles R Kasenge
(74) *Attorney, Agent, or Firm* — JCIPRNET (57) ABSTRACT

A production line operation forecast method and a production line operation forecast system are provided. The production line operation forecast method includes the following steps: obtaining an online production line work-in-process map at a time point, generating candidate simulated dispatch decisions based on the online production line work-in-process map, and inferring production-line work-in-process map changes of the candidate simulated dispatch decisions at a next time point; inputting the production-line work-in-process map changes to a forecast model, such that the forecast model outputs simulated production line operation health indicators of the candidate simulated dispatch decisions at the next time point; and selecting one of the candidate simulated dispatch decisions as a scheduling dispatch decision.

16 Claims, 6 Drawing Sheets

Obtain historical production line WIP maps, and generate historical production line operation health indicators according to the historical production line WIP maps — S310

Train the forecast model according to the historical production line WIP maps and the historical production line operation health indicators — S320

(51) Int. Cl.
*G06Q 10/0639* (2023.01)
*G06Q 10/067* (2023.01)
*G06Q 50/04* (2012.01)

(56) References Cited

U.S. PATENT DOCUMENTS

| | | |
|---|---|---|
| 11,054,808 B2 | 7/2021 | Wynne et al. |
| 11,256,241 B1 * | 2/2022 | Sobalvarro ...... G05B 19/41885 |
| 2011/0040596 A1 | 2/2011 | Chen et al. |
| 2023/0213906 A1 * | 7/2023 | Liu ..................... G06Q 10/063 700/112 |

FOREIGN PATENT DOCUMENTS

| | | |
|---|---|---|
| TW | I240154 | 9/2005 |
| TW | I594100 | 8/2017 |
| TW | I604392 | 11/2017 |
| TW | 201923584 | 6/2019 |
| TW | 201947474 | 12/2019 |
| TW | 202101142 | 1/2021 |

OTHER PUBLICATIONS

Akshay Thakur et al., "Survey into predictive key performance indicator analysis from data mining perspective", 2020 25th IEEE International Conference on Emerging Technologies and Factory Automation, Sep. 2020, pp. 476-483.
"Office Action of Taiwan Counterpart Application", issued on Jun. 9, 2023, p. 1-p. 3.

* cited by examiner

PRODUCTION LINE OPERATION FORECAST METHOD AND PRODUCTION LINE OPERATION FORECAST SYSTEM

CROSS-REFERENCE TO RELATED APPLICATION

This application claims the priority benefit of Taiwan application serial no. 111115669, filed on Apr. 25, 2022. The entirety of the above-mentioned patent application is hereby incorporated by reference herein and made a part of this specification.

BACKGROUND

Technical Field

The disclosure relates to a production line operation forecast method and a production line operation forecast system.

Description of Related Art

It is possible that machines of a production line in a factory are shared by different manufacturing processes. One of the common operation problems of a general production line in this regard includes the scenario where the work-in-process (WIP) moves of multiple machines (at the production line stations) are out of balance, which may result in a large amount of WIP input but with a small amount of outputs, or a low utilization or overuse of some specific equipment. In a specific industry, this problem in production lines often leads to problems like a large amount of WIPs exceeding the "Q-time" and a large amount of reworks. Therefore, it is a critical task in production-line operation planning and management to evaluate the entire production line operation health effectively, so as to achieve a stable input and output WIP quantity of the production line to lower the risk of being unable to produce the WIPs in the factory and assist the production line manager in dispatching operations.

SUMMARY

The disclosure is directed to a production line operation forecast method and a production line operation forecast system which are adapted to predict a production line operation effectively, such that a production line manager is adapted to perform dispatches to maintain production line stability, and the production line is maintained or restored to stability.

The disclosure provides a production line operation forecast method including following steps: obtaining an online production line work-in-process map at a time point, generating a plurality of candidate simulated dispatch decisions based on the online production line work-in-process map, and inferring a plurality of production-line work-in-process map changes of the plurality of candidate simulated dispatch decisions at a next time point; inputting the plurality of production-line work-in-process map changes to a forecast model such that the forecast model outputs a plurality of simulated production line operation health indicators of the plurality of candidate simulated dispatch decisions at the next time point; and selecting one of the candidate simulated dispatch decisions as a scheduling dispatch decision.

The disclosure provides a production line operation forecast system including a processor and a storage unit. The storage unit is coupled to the processor and stores a forecast model and a scheduling module. The processor executes following operations: the processor obtains an online production line work-in-process map at a time point, generates a plurality of candidate simulated dispatch decisions based on the online production line work-in-process map, and infers a plurality of production-line work-in-process map changes of the plurality of candidate simulated dispatch decisions at a next time point; the processor inputs the plurality of production-line work-in-process map changes to the forecast model such that the forecast model outputs a plurality of simulated production line operation health indicators of the plurality of candidate simulated dispatch decisions at the next time point; and the processor executes the scheduling module to select one of the candidate simulated dispatch decisions as a scheduling dispatch decision.

Based on the above description, the production line operation forecast method and the production line operation forecast system disclosed in the disclosure may make forecasts for different dispatch decisions, such that a production line manager may perform better scheduling dispatch according to a forecast result, and a production line operation has a good operational efficiency.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

Figure 1:
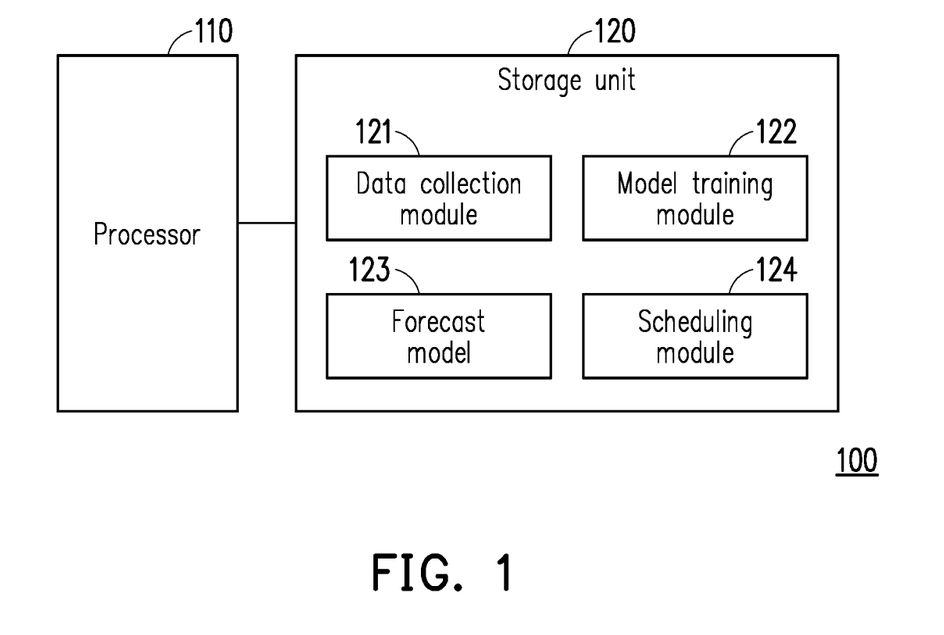
FIG. 1 is a schematic diagram of a production line operation forecast system according to an embodiment of the disclosure.

FIG. 1 is a schematic diagram of a production line operation forecast system according to an embodiment of the disclosure. Referring to FIG. 1, a production line operation forecast system 100 includes a processor 110 and a storage unit 120. The processor 110 is coupled to the storage unit 120. The storage unit 120 may store a data collection module 121, a model training module 122, a forecast model 123 and a scheduling module 124. In the embodiment, the production line operation forecast system 100 may be suitable for, for example, a related production line operation forecast application such as a semiconductor process production line operation forecast application, an electronic product production line operation forecast application, or a specific tool production line operation forecast application, etc., which is not limited by the disclosure.

In the embodiment, the processor 110 may first execute the data collection module 121. The data collection module 121 may collect a plurality of related historical production line operation data, and generate corresponding plurality of training data according to the related historical production line operation data. Then, the processor 110 may execute the model training module 122. The model training module 122 may train the forecast model 123 according to the training data. Then, the processor 110 may execute the scheduling module 124 to input a plurality of production line WIP map changes generated based on an online production line WIP map at a time point (for example, a current time point) to the forecast module 123, such that the forecast module 123 may output a plurality of simulated production line operation health indicators corresponding to different simulated dispatch decisions at a next time point. Therefore, a production line manager may perform production line scheduling evaluation based on the simulated production line operation health indicators, so as to determine a better scheduling dispatch decision. Alternatively, in an embodiment, the processor 110 may automatically perform determination according to the simulated production line operation health indicators, and automatically select a better simulated dispatch decision to operate an automated production line.

In the embodiment, the better simulated dispatch decision may, for example, refer to a scheduling dispatch decision that influences the WIP map without, for example, accumulating the WIPs at a specific station for processing or increases operation efficiency of station equipment. In the embodiment, the production line WIP map changes refer to changes in a quantity of the WIPs processed by multiple production line stations on the production line respectively corresponding to multiple manufacturing processes at different time points, which are, for example, changes in the quantity of the WIPs of online production line WIP maps 203, 602, 603 shown in FIG. 6B.

In the embodiment, the processor 110 may include, for example, a central processing unit (CPU) or other programmable general-purpose or special-purpose microprocessors, a digital signal processor (DSP), a programmable controller, an application specific integrated circuit (ASIC), a programmable logic device (PLD), other similar processing devices, or a combination of these devices. The storage unit 120 may be, for example, a dynamic random access memory (DRAM), a flash memory, or a non-volatile random access memory (NVRAM), etc.

In the embodiment, the production line operation forecast system 100 may be implemented by, for example, a computer device, where the processor 110 and the storage unit 120 may be integrated in the computer device. Alternatively, in an embodiment, the storage unit 120 is built in a cloud server, and the processor 110 is a computing unit of an electronic device on a user side. In this way, the production line manager may connect to the cloud server by operating the electronic device, and provide related data from the electronic device to the cloud server, so as to use computing resources of the cloud server to perform related production line operation forecast of various embodiments of the disclosure, and return a forecast result to the electronic device operated by the production line manager.

Figure 2:
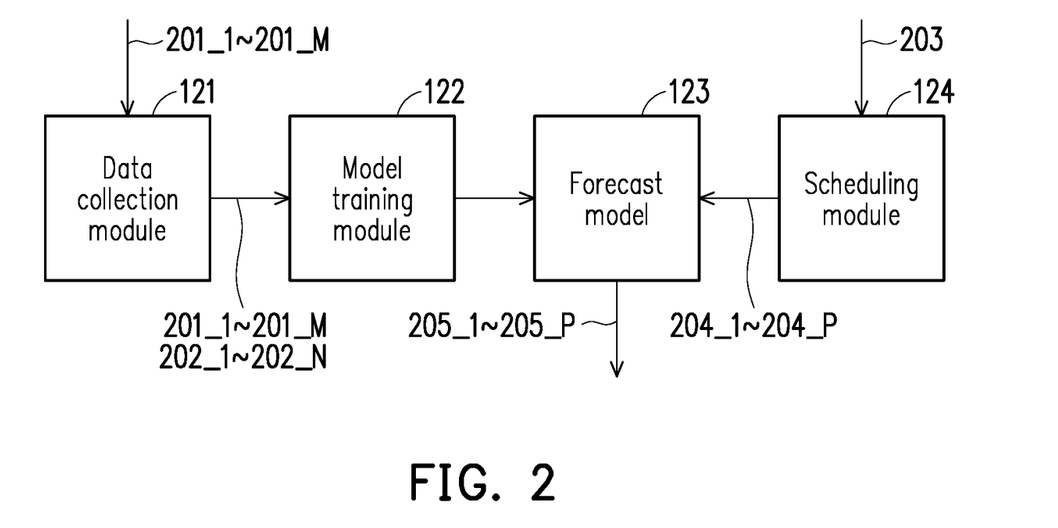
FIG. 2 is a schematic diagram of performing production line operation forecast according to an embodiment of the disclosure.
Figure 3:
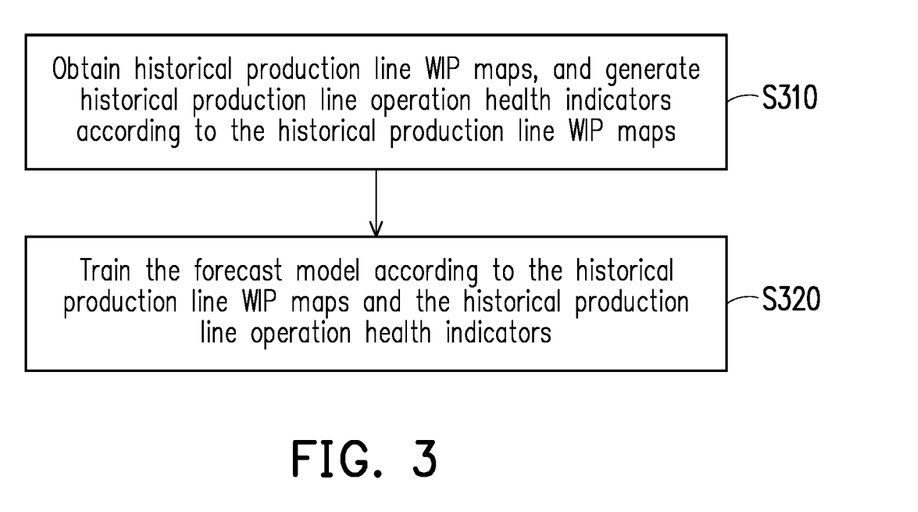
FIG. 3 is a flowchart of training a forecast model according to an embodiment of the disclosure.

FIG. 2 is a schematic diagram of performing production line operation forecast according to an embodiment of the disclosure. FIG. 3 is a flowchart of training a forecast model according to an embodiment of the disclosure. Referring to FIG. 1 to FIG. 3, the processor 110 may perform steps S310 and S320 as shown in FIG. 3 to train a forecast model 123. In step S310, the processor 110 may execute the data collection module 121 to obtain a plurality of historical production line WIP maps 201_1 to 201_M, and generate a plurality of historical production line operation health indicators 202_1 to 202_N according to the historical production line WIP maps 201_1 to 201_M, where M and N are positive integers. In step S320, the processor 110 can execute the model training module 122 to train the forecast model 123 according to the historical production line WIP maps 201_1 to 201_M and the historical production line operation health indicators 202_1 to 202_N.

In the embodiment, the data collection module 121 may obtain the historical production line WIP maps 201_1 to 201_M through a file reading method, a data retrieval interface, or through a method of accessing a database. The historical production line WIP maps 201_1 to 201_M may be, for example, a plurality of work procedures and/or a plurality of work orders corresponding to a plurality of production line stations. The data collection module 121 may generate a training data set according to the historical production line WIP maps 201_1 to 201_M and the historical production line operation health indicators 202_1 to 202_N, and the model training module 122 may train the forecast model 123 according to the training data set.

In the embodiment, the forecast model 123 may be a regression model, but the disclosure is not limited thereto. The processor 110 may establish a regression model for the historical production line operation health indicators 202_1 to 202_N based on a deep neural network (DNN), ridge regression or support vector regression (SVR). Moreover, the model training module 122 may train the regression model according to the aforementioned training data set. In the embodiment, the historical production line operation health indicators 202_1 to 202_N may be a plurality of historical key performance indicators (KPI) corresponding to different production line stations respectively performing different manufacturing processes, and the historical KPIs may be, for example, a plurality of historical (WIP) move variation values, a plurality of historical (WIP) moves, or a plurality of historical overall equipment effectiveness (OEE) corresponding to different production line stations and different manufacturing processes, but the disclosure is not limited thereto.

Figure 4A:
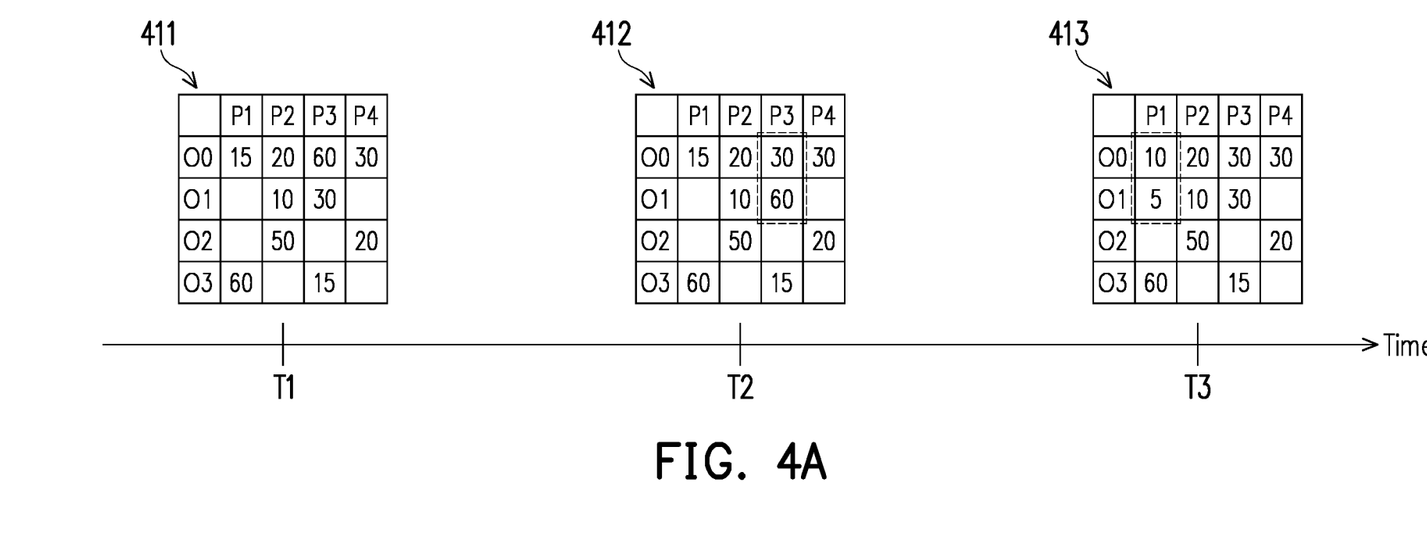
FIG. 4A is a schematic diagram of a plurality of historical production line WIP maps according to an embodiment of the disclosure.
Figure 4B:
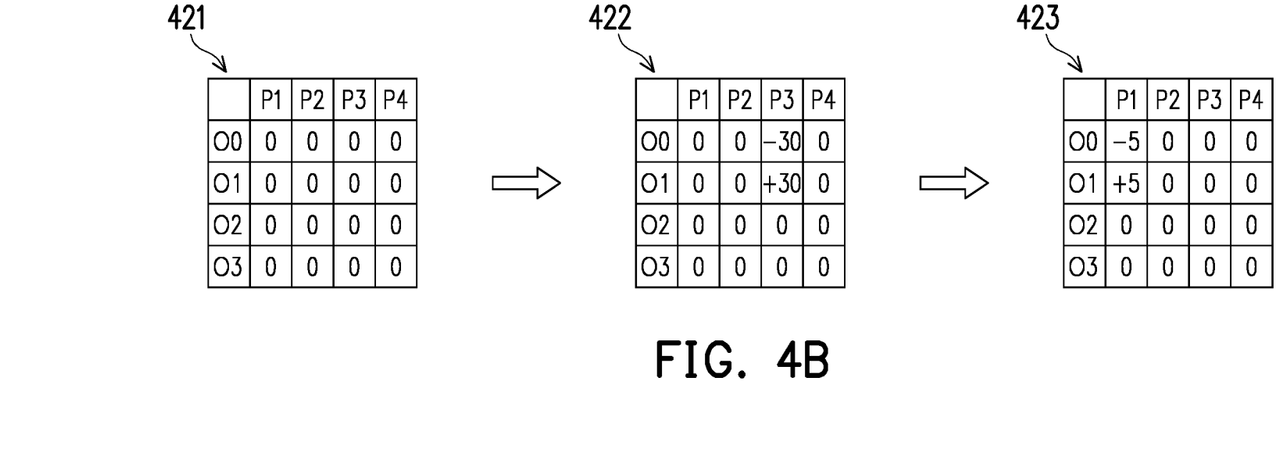
FIG. 4B is a schematic diagram of a plurality of historical production line operation health indicators according to an embodiment of the disclosure.

For example, referring to FIG. 4A and FIG. 4B together, FIG. 4A is a schematic diagram of a plurality of historical production line WIP maps according to an embodiment of the disclosure. FIG. 4B is a schematic diagram of a plurality of historical production line operation health indicators according to an embodiment of the disclosure. The data collection module 121 may, for example, obtain historical production line WIP maps 411 to 413 that change along with time T1 to T3 as shown in FIG. 4A, where the historical production line WIP maps 411 to 413 may include WIP quantities respectively corresponding to a plurality of production line stations O0 to O3 and a plurality of processes (manufacturing processes) at the time T1 to T3. Then, taking the historical KPIs as historical moves as an example, the data collection module 121 may generate, for example, move information 421 to 423 calculated according to the historical production line WIP maps 411 to 413 as shown in FIG. 4B to serve as the historical production line operation health indicators.

Regarding the move information 421 calculated according to the WIP map, since the historical production line WIP map 411 is a first piece of information, the history moves corresponding to different production line stations O0 to O3 and different manufacturing processes P1 to P4 are all 0. Regarding the move information 422 calculated according to the WIP map, by comparing the historical production line WIP maps 411 and 412, it is learned that a quantity of the WIPs of the production line station O0 in the manufacturing process P3 is reduced by 30, and a quantity of the WIPs of the production line station O1 in the manufacturing process P3 is increased by 30.

Regarding the move information 423 calculated according to the WIP map, by comparing the historical production line WIP maps 412 and 413, it is learned that a quantity of the WIPs of the production line station O0 in the manufacturing process P1 is reduced by 5, and a quantity of the WIPs of the production line station O1 in the manufacturing process P1 is increased by 5.

In this way, the model training module 122 may train the forecast model 123 according to the historical production line WIP maps 411 to 413, the move information 421 to 423 calculated according to the WIP map, and/or other corresponding historical production line operation health indicator information, such that the trained forecast model 123 may have a function of automatically forecasting the corresponding different simulated production line operation health indicators according to the different WIP map changes. In the embodiment, the simulated production line operation health indicators may be a plurality of simulated KPIs corresponding to different production line stations respectively performing different manufacturing processes, and the simulated KPIs may be, for example, a plurality of simulated (WIP) move variation values, a plurality of simulated (WIP) moves, or a plurality of simulated overall equipment effectiveness corresponding to different production line stations and different manufacturing processes, but the disclosure is not limited thereto.

Figure 5:
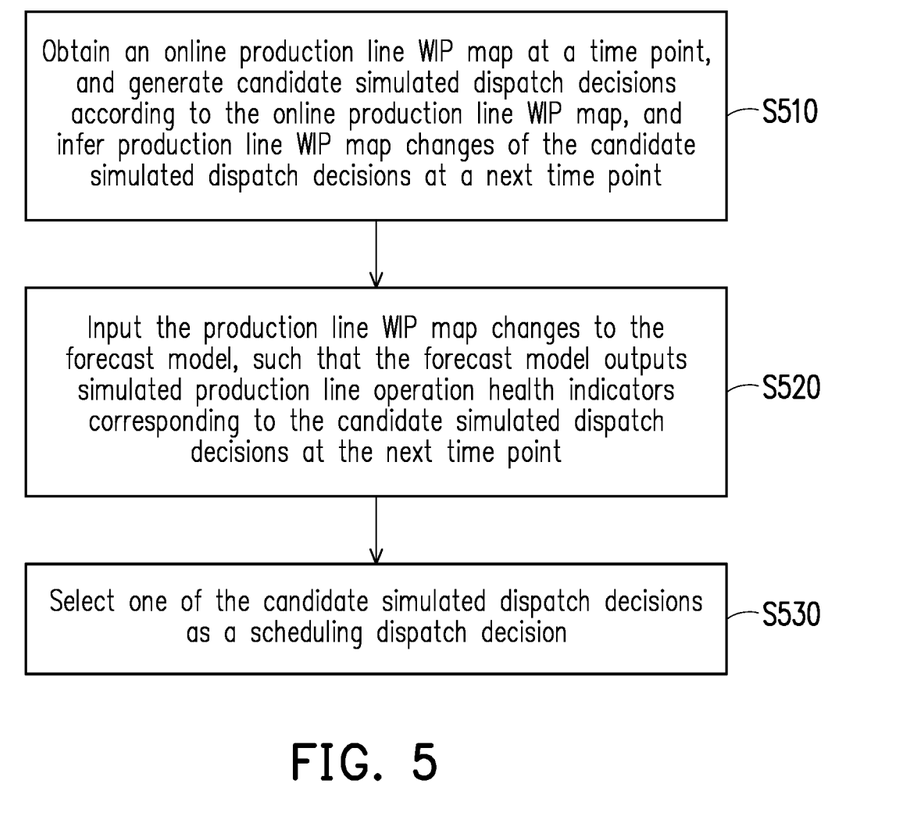
FIG. 5 is a flowchart of a production line operation forecast method according to an embodiment of the disclosure.

FIG. 5 is a flowchart of a production line operation forecast method according to an embodiment of the disclosure. Referring to FIG. 1, FIG. 2 and FIG. 5, the processor 110 may continue the description of FIG. 2 to execute steps S510 to S530 shown in FIG. 5 to train the forecast model 123. In step S510, the processor 110 may obtain the online production line WIP map 203 at a time point, and the processor 110 may execute the scheduling module 124 to generate a plurality of candidate simulated dispatch decisions according to the online production line WIP map 203. The candidate simulated dispatch decisions refers to automatically generating in advance a variety of dispatch modes that may be dispatched to different production line stations selection. Moreover, the scheduling module 124 may infer a plurality of production line WIP map changes 204_1 to 204_P of the plurality of candidate simulated dispatch decisions at a next time point, where P is a positive integer. In step S520, the processor 110 may input the plurality of production line WIP map changes 204_1 to 204_P to the forecast model 123, such that the forecast model 123 may output a plurality of simulated production line operation health indicators 205_1 to 205_P corresponding to the plurality of candidate simulated dispatch decisions at the next time point. In step S530, the processor 110 may select at least one of the candidate simulated dispatch decisions as a scheduling dispatch decision. In the embodiment, the processor 110 may execute the scheduling module 124 to select at least one of the plurality of candidate simulated dispatch decisions having the lowest move variation value, the lowest move, or the highest overall equipment effectiveness as the scheduling dispatch decision.

Figure 6A:
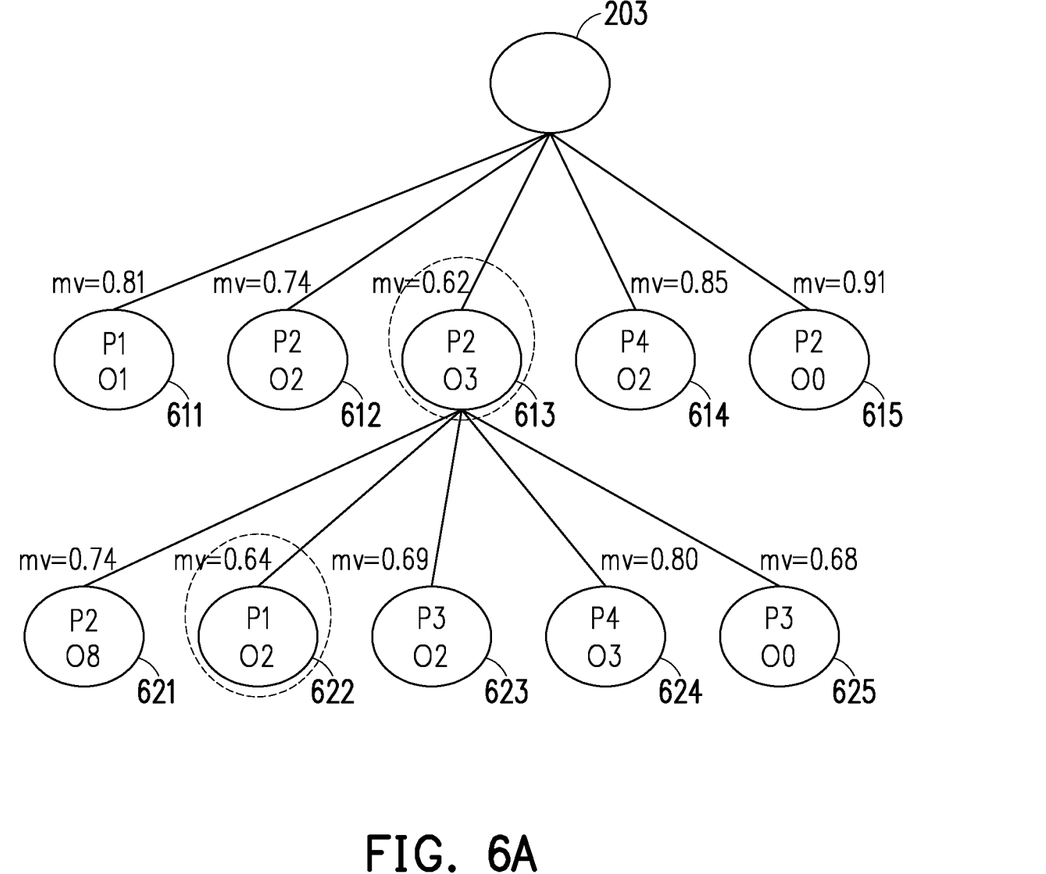
FIG. 6A is a schematic diagram of deciding a plurality of candidate simulated dispatch states according to an embodiment of the disclosure.
Figure 6B:
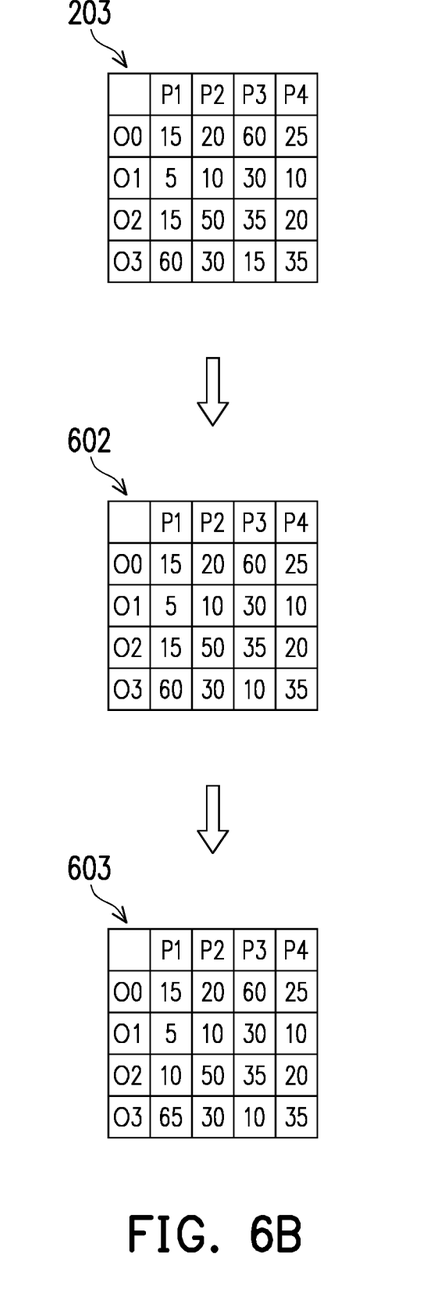
FIG. 6B is a schematic diagram of a plurality of simulated production line WIP maps according to an embodiment of the disclosure.

For example, referring to FIG. 6A and FIG. 6B together, FIG. 6A is a schematic diagram of deciding a plurality of candidate simulated dispatch states according to an embodiment of the disclosure. FIG. 6B is a schematic diagram of a plurality of simulated production line WIP maps according to an embodiment of the disclosure. The scheduling module 124 may, for example, generate a plurality of candidate simulated dispatch decisions 611 to 615 and 621 to 625 according to the online production line WIP map 203. The candidate simulated dispatch decisions 611 to 615 and 621 to 625 respectively correspond to a plurality of manufacturing processes P1 to P4 and a plurality of production line stations O0 to O3. The candidate simulated dispatch decisions 611 to 615 may be used to represent the dispatch modes of the online production line WIP map 203 that may be implemented at the next time point, and the candidate simulated dispatch decisions 621 to 625 may be used to represent a plurality of dispatch modes of the online production line WIP map 203 that may be implemented at a further next time point after dispatch is performed according to the candidate simulated dispatch decision 613. The candidate simulated dispatch decisions 611, 612, 614, and 615 also respectively have a plurality of dispatch modes that can be implemented at the further next time point, which are not limited to those shown in FIG. 6A.

In other words, the scheduling module 124 may establish a plurality of simulated dispatch decisions of a tree-like structure relationship. Then, the scheduling module 124 may infer each of the candidate simulated dispatch decisions 611 to 615 and 621 to 625 to obtain a plurality of production line WIP map changes respectively corresponding to the candidate simulated dispatch decisions 611 to 615 and 621 to 625, i.e., the online production line WIP map 203 is updated respectively according to the candidate simulated dispatch decisions 611 to 615 and 621 to 625, so as to respectively simulate a plurality of simulated production line WIP maps at the next time point. Finally, the scheduling module 124 may input the plurality of simulated production line WIP maps (the production line WIP map changes) of the next time point to the forecast model 123, such that the forecast model 123 may respectively forecast a plurality of move variation values my (a plurality of simulated production line operation health indicators) corresponding to the candidate simulated dispatch decisions 611 to 615 and 621 to 625.

Taking the continuous candidate simulated dispatch decisions 613 and 622 as an example, the online production line WIP map 203 may be as shown in FIG. 6B, where the online production line WIP map 203 may include WIP quantities corresponding to the plurality of production line stations O0 to O3 and the plurality of manufacturing processes P1 to P4 at a current time point. Then, the candidate simulated dispatch decision 613 is, for example, to dispatch a specific amount of WIPs in the manufacturing process P3 and the production line station O3, such that the online production line WIP map 203 may be updated to the online production line WIP map 602 at the next time point. Then, the candidate simulated dispatch decision 622 is, for example, to dispatch a specific amount of WIPs in the manufacturing process P1 and the production line station O0, such that the online production line WIP map 602 may be updated to the online production line WIP map 603 at the further next time point.

Therefore, referring to FIG. 6A again, the scheduling module 124 may sequentially select the candidate simulated dispatch decisions 613 (mv=0.62) and 622 (mv=0.64) that have the lowest move variation values at different time points as production line scheduling decisions. In other words, a production line manager may perform production line scheduling dispatch evaluation according to the plurality of move variation values my of the candidate simulated dispatch decisions 611 to 615 and 621 to 625, so as to further determine the better scheduling dispatch decisions in the candidate nodes. Alternatively, in an embodiment, the processor 110 may automatically perform update calculation according to the plurality of move variation values my of the candidate simulated dispatch decisions 611 to 615 and 621 to 625, and operate the production line scheduling decision by selecting one of the candidate nodes with the lowest move variation value as a better simulated dispatch decision. The better simulated dispatch decision may, for example, refer to a scheduling dispatch decision that may affect the WIP map and, for example, prevent WIPs from piling up at a specific station for processing or increase operating efficiency of station equipment.

In addition, it should be noted that the candidate simulated dispatch decision according to each embodiment of the disclosure may also be referred to as a "legal candidate simulated dispatch decision." Furthermore, since there will be no candidate simulated dispatches that are not subordinate to a next process during the product manufacturing process (which means that a generation logic of the simulated dispatches must be complied with a processing order of each product). Therefore, the candidate simulated dispatch decisions generated by the scheduling module in each embodiment of the disclosure also conform to the legal dispatch method of the processing order of the current products.

In summary, the production line operation forecast method and the production line operation forecast system disclosed in the disclosure may use the trained forecast model to effectively forecast the plurality of simulated production line operation health indicators respectively corresponding to the updated online production line WIP maps corresponding to the online production line WIP maps after a plurality of simulated dispatch decisions. The production line manager may perform effective production line scheduling dispatch evaluation based on the plurality of simulated production line operation health indicators corresponding to these simulated dispatch decisions, such that the simulated dispatch decisions with better health indicators may be selected to further determine better actual scheduling dispatch decisions, and make a production line maintaining or restoring stability during the production process. In addition, the production line operation forecast system of the disclosure may also automatically perform determinations based on the plurality of simulated production line operation health indicators of different simulated dispatch decisions, and automatically select a simulated dispatch decision with a better health indicator to operate the automated production line, such that the automated production line may maintain or restore stability after automatic dispatch during the production process.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A production line operation forecast method, comprising:
  obtaining an online production line work-in-process map at a time point by a processor, generating a plurality of candidate simulated dispatch decisions based on the online production line work-in-process map, and inferring a plurality of production-line work-in-process map changes of the plurality of candidate simulated dispatch decisions at a next time point;
  inputting the plurality of production-line work-in-process map changes to a forecast model by the processor, such that the forecast model outputs a plurality of simulated production line operation health indicators of the plurality of candidate simulated dispatch decisions at the next time point;
  selecting one of the plurality of candidate simulated dispatch decisions as a scheduling dispatch decision by the processor;
  obtaining a plurality of historical production line work-in-process maps by the processor, and generating a plurality of historical production line operation health indicators according to the plurality of historical production line work-in-process maps; and
  training the forecast model by the processor according to the plurality of historical production line work-in-process maps and the plurality of historical production line operation health indicators,
  wherein the forecast model is a regression model.

2. The production line operation forecast method as claimed in claim 1, wherein the plurality of candidate simulated dispatch decisions respectively correspond to a plurality of manufacturing processes and a plurality of production line stations.

3. The production line operation forecast method as claimed in claim 2, wherein the plurality of simulated production line operation health indicators are a plurality of key performance indicators corresponding to the plurality of production line stations respectively performing the plurality of manufacturing processes.

4. The production line operation forecast method as claimed in claim 3, wherein the plurality of key performance indicators are a plurality of move variation values, a plurality of moves, or a plurality of overall equipment effectiveness.

5. The production line operation forecast method as claimed in claim 1, wherein selecting one of the plurality of candidate simulated dispatch decisions as the scheduling dispatch decision comprises:
  selecting at least one of the plurality of candidate simulated dispatch decisions having a lowest move variation value, a lowest move, or a highest overall equipment effectiveness as the scheduling dispatch decision.

6. The production line operation forecast method as claimed in claim 1, wherein training the forecast model comprises:
  establishing a regression model for the plurality of historical production line operation health indicators by the processor based on a deep neural network, ridge regression, or support vector regression; and
  training the regression model by the processor according to the plurality of historical production line work-inprocess maps and the plurality of historical production line operation health indicators.

7. The production line operation forecast method as claimed in claim 1, wherein the plurality of historical production line operation health indicators are a plurality of historical key performance indicators respectively corresponding to different production line stations respectively performing different manufacturing processes.

8. The production line operation forecast method as claimed in claim 7, wherein the plurality of historical key performance indicators comprise a plurality of historical move variation values, a plurality of historical moves, or a plurality of historical overall equipment effectiveness.

9. A production line operation forecast system, comprising:
a processor; and
a storage unit coupled to the processor and storing a forecast model and a scheduling module, wherein the processor executes operations as follows:
the processor obtains an online production line work-in-process map at a time point, generates a plurality of candidate simulated dispatch decisions based on the online production line work-in-process map, and infers a plurality of production-line work-in-process map changes of the plurality of candidate simulated dispatch decisions at a next time point;
the processor inputs the plurality of production-line work-in-process map changes to the forecast model, such that the forecast model outputs a plurality of simulated production line operation health indicators of the plurality of candidate simulated dispatch decisions at the next time point; and
the processor executes the scheduling module to select one of the plurality of candidate simulated dispatch decisions as a scheduling dispatch decision,
wherein the storage unit further stores a data collection module and a model training module, wherein
the processor executes the data collection module to obtain a plurality of historical production line work-in-process maps, and generate a plurality of historical production line operation health indicators according to the plurality of historical production line work-in-process maps; and
the processor executes the model training module to train the forecast model according to the plurality of historical production line work-in-process maps and the plurality of historical production line operation health indicators,
wherein the forecast model is a regression model.

10. The production line operation forecast system as claimed in claim 9, wherein the plurality of candidate simulated dispatch decisions respectively correspond to a plurality of manufacturing processes and a plurality of production line stations.

11. The production line operation forecast system as claimed in claim 10, wherein the plurality of simulated production line operation health indicators are a plurality of key performance indicators corresponding to the plurality of production line stations respectively performing the plurality of manufacturing processes.

12. The production line operation forecast system as claimed in claim 11, wherein the plurality of key performance indicators are a plurality of move variation values, a plurality of moves, or a plurality of overall equipment effectiveness.

13. The production line operation forecast system as claimed in claim 9, wherein the processor executes the scheduling module to select at least one of the plurality of candidate simulated dispatch decisions having a lowest move variation value, a lowest move, or a highest overall equipment effectiveness as the scheduling dispatch decision.

14. The production line operation forecast system as claimed in claim 9, wherein the processor establishes a regression model for the plurality of historical production line operation health indicators based on a deep neural network, ridge regression, or support vector regression, and the processor trains the regression model according to the plurality of historical production line work-in-process maps and the plurality of historical production line operation health indicators.

15. The production line operation forecast system as claimed in claim 9, wherein the plurality of historical production line operation health indicators are a plurality of historical key performance indicators respectively corresponding to different production line stations respectively performing different manufacturing processes.

16. The production line operation forecast system as claimed in claim 15, wherein the plurality of historical key performance indicators comprise a plurality of historical move variation values, a plurality of historical moves, or a plurality of historical overall equipment effectiveness.

* * * * *

UNITED STATES PATENT AND TRADEMARK OFFICE
CERTIFICATE OF CORRECTION

PATENT NO. : 12,254,426 B2  
APPLICATION NO. : 17/874302  
DATED : March 18, 2025  
INVENTOR(S) : Tsan-Cheng Su et al.

Page 1 of 1

It is certified that error appears in the above-identified patent and that said Letters Patent is hereby corrected as shown below:

On the Title Page

Column 1 add Item (30) Foreign Application Priority Data: April 25, 2022 (TW) .........111115669

Signed and Sealed this
Twenty-ninth Day of April, 2025

Coke Morgan Stewart  
*Acting Director of the United States Patent and Trademark Office*